(12) United States Patent
Tang et al.

(10) Patent No.: US 7,663,969 B2
(45) Date of Patent: Feb. 16, 2010

(54) USE OF LAMB WAVES IN CEMENT BOND LOGGING

(75) Inventors: Xiao-Ming Tang, Sugar Land, TX (US); Alexei Bolshakov, Pearland, TX (US); Joseph Barolak, Spring, TX (US); Douglas Patterson, Spring, TX (US); Vladimir Dubinsky, Houston, TX (US); Ron Alers, San Luis Obispo, CA (US); George Alers, San Luis Obispo, CA (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 11/070,037

(22) Filed: Mar. 2, 2005

(65) Prior Publication Data
US 2006/0198243 A1 Sep. 7, 2006

(51) Int. Cl.
*G01V 1/48* (2006.01)
*G01V 1/50* (2006.01)

(52) U.S. Cl. .................. 367/35; 367/31; 181/105

(58) Field of Classification Search .................. 367/25, 367/30, 31, 35; 73/152.02, 152.58, 152.57; 181/105
See application file for complete search history.

(56) References Cited
U.S. PATENT DOCUMENTS

| | | | |
|---|---|---|---|
| 3,699,481 A | 10/1972 | Thompson et al. | |
| 3,850,028 A | 11/1974 | Thompson et al. | |
| 3,909,775 A * | 9/1975 | Lavigne ............... | 367/32 |
| 4,048,847 A | 9/1977 | Alers et al. | |
| 4,080,836 A | 3/1978 | Thompson et al. | |
| 4,092,868 A | 6/1978 | Thompson et al. | |
| 4,104,922 A | 8/1978 | Alers et al. | |
| 4,122,725 A | 10/1978 | Thompson | |
| 4,184,374 A | 1/1980 | Thompson et al. | |
| 4,218,924 A | 8/1980 | Fortunko et al. | |
| 4,248,092 A | 2/1981 | Vasile et al. | |
| 4,289,030 A | 9/1981 | Alers et al. | |
| 4,295,214 A | 10/1981 | Thompson | |
| 4,301,684 A | 11/1981 | Thompson et al. | |
| 4,305,294 A | 12/1981 | Vasile et al. | |
| 4,307,612 A | 12/1981 | Elsey et al. | |
| 4,320,661 A | 3/1982 | Peterson et al. | |
| 4,434,663 A | 3/1984 | Peterson et al. | |
| 4,522,071 A | 6/1985 | Thompson | |
| 4,703,427 A * | 10/1987 | Catala et al. .............. | 367/35 |
| 4,805,156 A | 2/1989 | Attali et al. | |

(Continued)

OTHER PUBLICATIONS

Zeroug, et al. "Ultrasonic Leaky-Lamb wave imaging through a highly contrasting layer." IEEE ultrasonics symposium, 2003.*

(Continued)

*Primary Examiner*—Scott A Hughes
(74) *Attorney, Agent, or Firm*—Bracewell & Giuliani LLP

(57) ABSTRACT

A method and apparatus useful to determine the integrity of a cement bond log disposed in the annular space between a casing and a wellbore. The method and apparatus induce a Lamb wave in the casing and into the wellbore. The Lamb wave attenuates upon passage through the cement bond log. The integrity of the cement bond log can be determined through an analysis and evaluation of the attenuation results.

16 Claims, 4 Drawing Sheets

U.S. PATENT DOCUMENTS

| | | | |
|---|---|---|---|
| 4,881,208 A * | 11/1989 | Liu .................... | 367/35 |
| 4,893,496 A | 1/1990 | Bau | |
| 4,896,303 A | 1/1990 | Leslie | |
| 4,899,589 A | 2/1990 | Thompson et al. | |
| 5,036,496 A * | 7/1991 | Rutledge .................... | 367/35 |
| 5,048,340 A | 9/1991 | Thompson et al. | |
| 5,154,081 A | 10/1992 | Thompson et al. | |
| 5,251,486 A | 10/1993 | Thompson et al. | |
| 5,299,458 A | 4/1994 | Clark, Jr. et al. | |
| 5,318,129 A * | 6/1994 | Wittrisch .................... | 367/86 |
| 5,357,481 A * | 10/1994 | Lester et al. .................. | 367/31 |
| 5,537,876 A | 7/1996 | Davidson et al. | |
| 5,763,773 A * | 6/1998 | Birchak et al. ................ | 367/35 |
| 5,907,131 A | 5/1999 | Tello | |
| 6,018,496 A * | 1/2000 | Stanke et al. .................. | 367/35 |
| 6,047,602 A | 4/2000 | Lynnworth | |
| 6,148,672 A * | 11/2000 | Cawley et al. ................ | 73/622 |
| 6,219,301 B1 | 4/2001 | Moriarty | |
| 6,568,271 B2 * | 5/2003 | Shah et al. .................... | 73/599 |
| 6,575,043 B1 | 6/2003 | Huang | |
| 6,666,095 B2 | 12/2003 | Thomas et al. | |
| 6,850,462 B2 | 2/2005 | McDaniel et al. | |
| 6,941,231 B2 * | 9/2005 | Zeroug et al. ................. | 702/39 |
| 7,237,438 B1 | 7/2007 | Umbach et al. | |
| 2003/0033870 A1 * | 2/2003 | Shah et al. .................... | 73/299 |
| 2005/0205268 A1 * | 9/2005 | Engels et al. ............... | 166/381 |

OTHER PUBLICATIONS

Na, et al. "A combination of PZT and EMAT transducers for interface inspection." Journal of the Acoustical Society of America, 2002.*

Sinha, et al. "Applications of Sonics and Ultrasonics in Geophysical Prospecting." 1999 IEEE Ultrasonics Symposium.*

Leslie, H.D. et al., SPE 16207, Coupling and Attenuation: A New Measurement Pair in Cement, pp. 243-250.

Thompson, R. B., Physical Principles of Measurements with EMAT Transducers, Physical Acoustics, vol. XIX, Center for Nondestructive Evaluation, Iowa State University, Ames, Iowa, pp. 157-200.

* cited by examiner

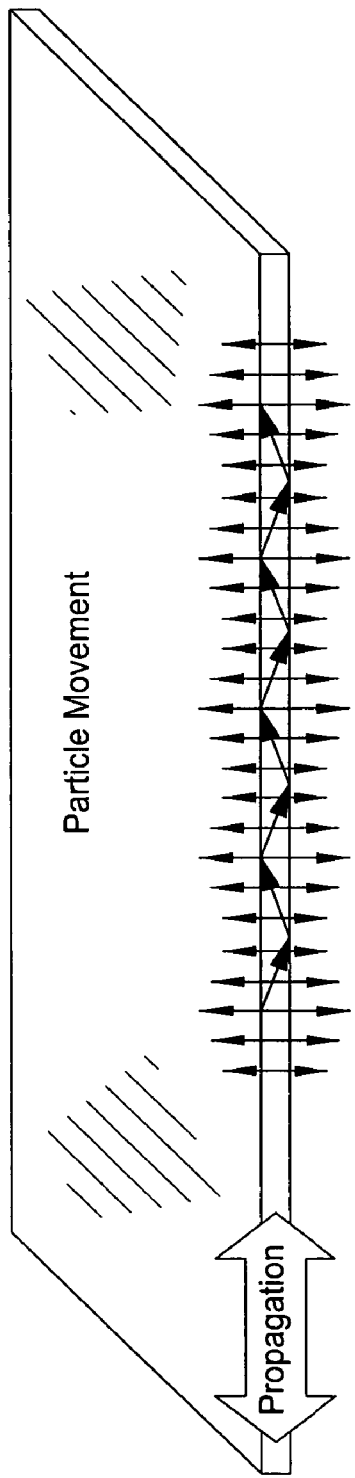
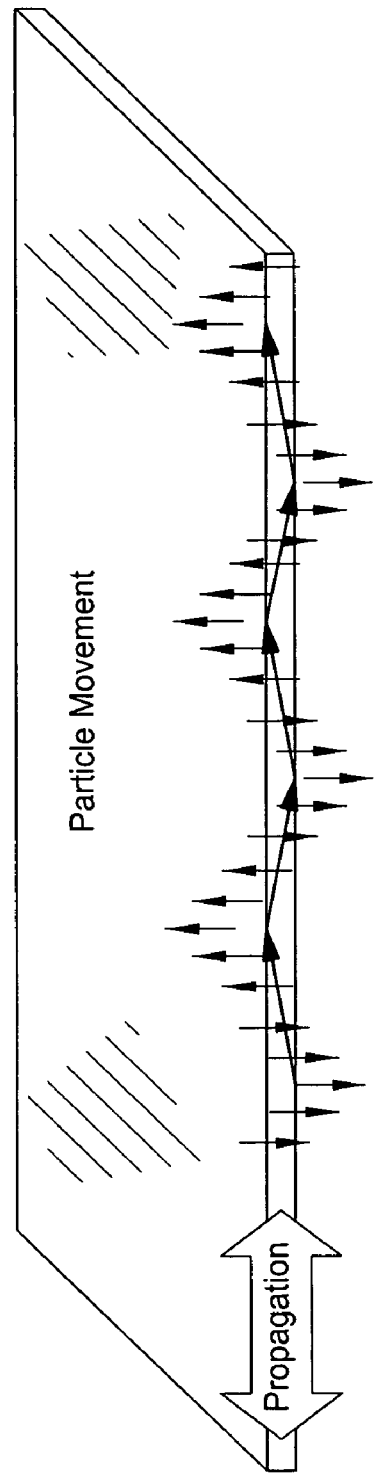
FIG. 2A
FIG. 2B

USE OF LAMB WAVES IN CEMENT BOND LOGGING

BACKGROUND OF THE INVENTION

1. Field of the Invention

The present invention relates to a method and apparatus to evaluate the integrity of bonds that adhere wellbore casing to a wellbore. The present invention further relates to a method and apparatus capable of evaluating bond integrity of bonding cements of different densities. Yet even more specifically, the present invention relates to a method and apparatus capable of evaluating cement bond integrity that can distinguish a casing bonded with a light weight cement from a casing surrounded with a micro-annulus fluid.

2. Description of Related Art

Hydrocarbon producing wellbores comprise casing 8 set within the wellbore 5, where the casing 8 is bonded to the wellbore by adding cement 9 within the annulus formed between the outer diameter of the casing 8 and the inner diameter of the wellbore 5. The cement bond not only adheres the casing 8 within the wellbore 5, but also serves to isolate adjacent zones (Z1 and Z2) within the formation 18 from one another. Isolating adjacent zones can be important when one of the zones contains oil or gas and the other zone includes a non-hydrocarbon fluid such as water. Should the cement 9 surrounding the casing 8 be defective and fail to provide isolation of the adjacent zones, water or other undesirable fluid can migrate into the hydrocarbon producing zone thus diluting or contaminating the hydrocarbons within the producing zone.

To detect possible defective cement bonds, downhole tools 14 have been developed for analyzing the integrity of the cement 9 bonding the casing 8 to the wellbore 5. Typically these downhole tools 14 are disposed within the wellbore 5 suspended on a wireline 10 via a pulley 12. The downhole tools 14 also usually include transducers 16 disposed on their outer surface capable of emitting acoustic waves into the casing 8 and recording the attenuation of the acoustic waves as they travel, or propagate, across the surface of the casing 8. The recorded attenuation can be transmitted to the surface through the wireline 10 where it can be analyzed. By analyzing the attenuation of the acoustic wave, the efficacy and integrity of the cement bond can be evaluated.

The amount of attenuation however can depend on how the acoustic wave is polarized and the coupling condition between the casing 8 and the cement 9. Typical downhole tools 14 having acoustic wave transducers 16 generate acoustic waves that are polarized perpendicular to the surface of the casing 8. Such waves are referred to as compression/shear or P-SV waves since the particle motion direction of either the compressional (P) or the shear (S) component of the acoustic wave is in a vertical (V) plane perpendicular to the casing 8. The attenuation of the acoustic wave as it propagates along the surface of the casing 8 depends the condition of the cement bond and is also dependent on the type of cement 9 disposed between the casing 8 and the formation 18. More specifically, as the acoustic wave propagates along the length of the casing 8, the wave loses, or leaks, energy into the formation 18 through the cement bond—it is this energy loss that produces the attenuation of the acoustic wave. Conversely, when the casing 8 is not bonded, a condition also referred to as "free pipe," the micro-annulus fluid behind the casing does not provide for any shear coupling between the casing 8 and the formation 18. Loss of shear coupling significantly reduces the compressional coupling between the casing 8 and the formation 18. This result occurs since fluid has no shear modulus as well as a much lower bulk modulus in relation to cement. Because of these physical characteristics of fluid, the entire SV component of the P-SV wave and a large portion of the P component of the P-SV wave do not propagate outside of the casing 8 and thus experience a much reduced attenuation.

Reduced attenuation of an acoustic wave is not limited to situations where the casing 8 is surrounded by fluid, but the presence of some types of cement can also significantly reduce acoustic wave attenuation. For example, light weight cement (LWC), or cement having a density less than approximately 12 lbs/gal can reduce acoustic wave attenuation. Light weight cement has a shear modulus, thus light weight cement can maintain shear coupling between the casing 8 and the formation 18. However, the density of light weight cement is not substantially greater than the density of many fluids (such as water), thus the attenuation of some acoustic waves, especially P-SV waves, is diminished when encountering casing 8 surrounded by a light weight cement. The result of this reduced attenuation is a decreased ability to detect the difference between fluid and light weight cement as well as a diminished capacity to detect poor cement bonds in light weight cement when using traditional acoustic methods.

Therefore, there exists a need for a device and method to conduct cement bond logs within a casing, where the device and method is capable of differentiating between fluid that surrounds a casing and light weight cement bonding a casing.

BRIEF SUMMARY OF THE INVENTION

The present invention includes a method of evaluating a casing bond disposed between a casing and a wellbore comprising inducing a Lamb wave into the casing, monitoring the Lamb wave, and estimating a characteristic of the casing bond based on the monitoring. The Lamb wave can be induced with a transmitting transducer, or a transmitting transducer combined with a receiving transducer. The Lamb wave can be monitored with a receiving transducer. The transmitting transducer can be an EMAT, a piezoelectric device, or a wedge transducer. The receiving transducer can be an EMAT and a piezoelectric device.

The step of estimating a characteristic of the casing bond can involve estimating the quality of the casing bond, estimating the integrity of cement forming the casing bond, identifying the presence of microannuluses within the casing bond, as well as estimating the thickness of the casing bond. The type of casing bond evaluated can include regular cement, light weight cement, and free pipe.

An alternative method of the present invention involves evaluating a casing bond disposed between a casing and a wellbore comprising, inserting a tool within the casing, inducing a Lamb wave in the casing with the downhole tool, monitoring the attenuation of the Lamb wave, and estimating a characteristic of the casing bond disposed between the casing and the wellbore based on an evaluation of the attenuation of the Lamb wave. The tool of this method of the present invention comprises at least one transmitting transducer capable of inducing the Lamb wave and at least one receiving transducer capable of monitoring the Lamb wave. The step of estimating a characteristic of the casing bond of this method can include estimating the quality of the casing bond, estimating the integrity of cement forming the casing bond, identifying the presence of microannuluses within the casing bond, and estimating the thickness of the casing bond. The casing bond considered with this method includes regular cement, light weight cement, and free pipe.

The present invention includes an evaluation tool formed for insertion within a wellbore comprising, a body formed for insertion within the casing of the wellbore, and at least one transducer disposed on the body. The transducer of the evaluation tool induces a Lamb wave within the casing. The transducer of the evaluation tool can be a piezoelectric device, a wedge transducer and an EMAT. Further, the evaluation tool can further comprise a receiving transducer and a transmitting transducer.

Accordingly, one of the advantages provided by the present invention is the ability to conduct cement bond logs within a casing while producing accurate bond log results that distinguish between fluid and light-weight cement surrounding the casing. The present invention is also capable of providing improved resolution of cement bond logs in regular cement as compared to convention methods using P-wave attenuation.

BRIEF DESCRIPTION OF THE SEVERAL VIEWS OF THE DRAWING

FIG. 2a illustrates a symmetric Lamb wave propagating through a plate.

FIG. 2b illustrates an antisymmetric Lamb wave propagating through a plate.

DETAILED DESCRIPTION OF THE INVENTION

The present invention includes a method and apparatus useful in determining characteristics of a casing bond disposed between a casing and a wellbore. The characteristics of the casing bond include the quality of the casing bond, the integrity of the cement that comprises the bond, the type of cement, and the thickness of the casing bond. The method generally involves inducing an acoustic wave in the casing proximate to the location where the casing bond is to be evaluated. The acoustic wave propagating within the casing can then be monitored to estimate characteristics of the casing bond. It is believed it is well within the scope of those skilled in the art to ascertain casing bond characteristics based on the monitoring of the induced acoustic wave, furthermore, this can be accomplished without undue experimentation.

Figure 6:
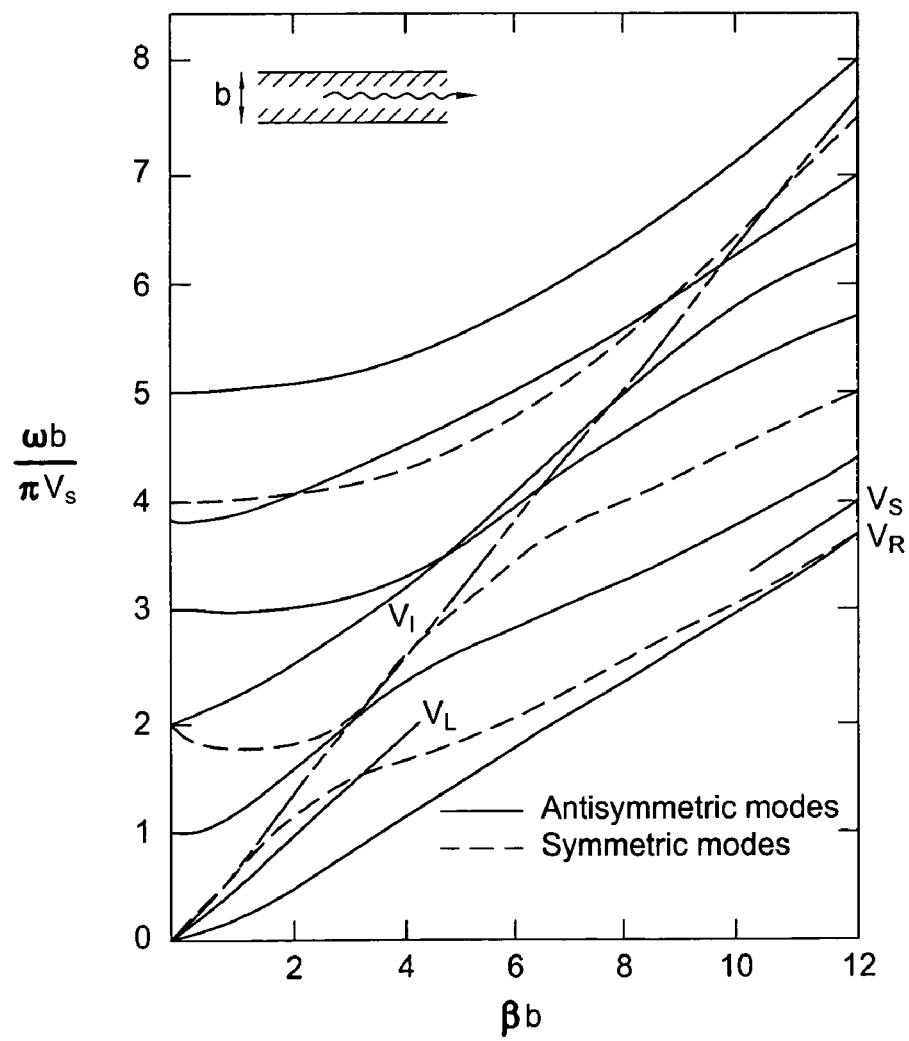
FIG. 6 depicts a Lamb wave dispersion curve.

Lamb waves are complex vibrational waves that travel through the entire thickness of a material. While different modes of waveforms are possible with Lamb waves, two of the most common types of Lamb waves are symmetric and anti-symmetric. With reference now to FIGS. 2a and 2b, an example of a symmetric Lamb wave and an anti-symmetric Lamb wave are illustrated propagating along a plate. In FIG. 2a a symmetric Lamb wave is demonstrated, here particle movement within the plate undergoes both compression and rarefaction as the wave passes along the plate. The compression and rarefaction particle movement of the symmetric Lamb wave within the plate is shown primarily in the vertical direction. The antisymmetric Lamb wave of FIG. 2b is a longitudinal shear wave that is vertically polarized such that the particle movement is also perpendicular to the plane of the plate. However the particle movement of the antisymmetric Lamb wave is generally in the same direction and thus does not experience the compression and rarefaction of the symmetric Lamb wave. The particular Lamb wave modes preferably are induced one at a time and at different excitation frequencies. As is well known, the Lamb wave frequency is dependent upon the thickness of the medium in which the Lamb wave is induced, the Lamb wave wavelength, and properties of the medium. This physical dependency is illustrated by the Lamb wave dispersion curves provided in FIG. 6. These curves depict the physical conditions necessary for a Lamb wave to effectively propagate through a medium. In FIG. 6, b is the medium thickness, $\beta$ is $2\pi/\lambda$, $\omega$ is $2\lambda f$, where $\lambda$ denotes wavelength and denotes frequency, and Vs is the velocity of the shear wave.

Figure 1:
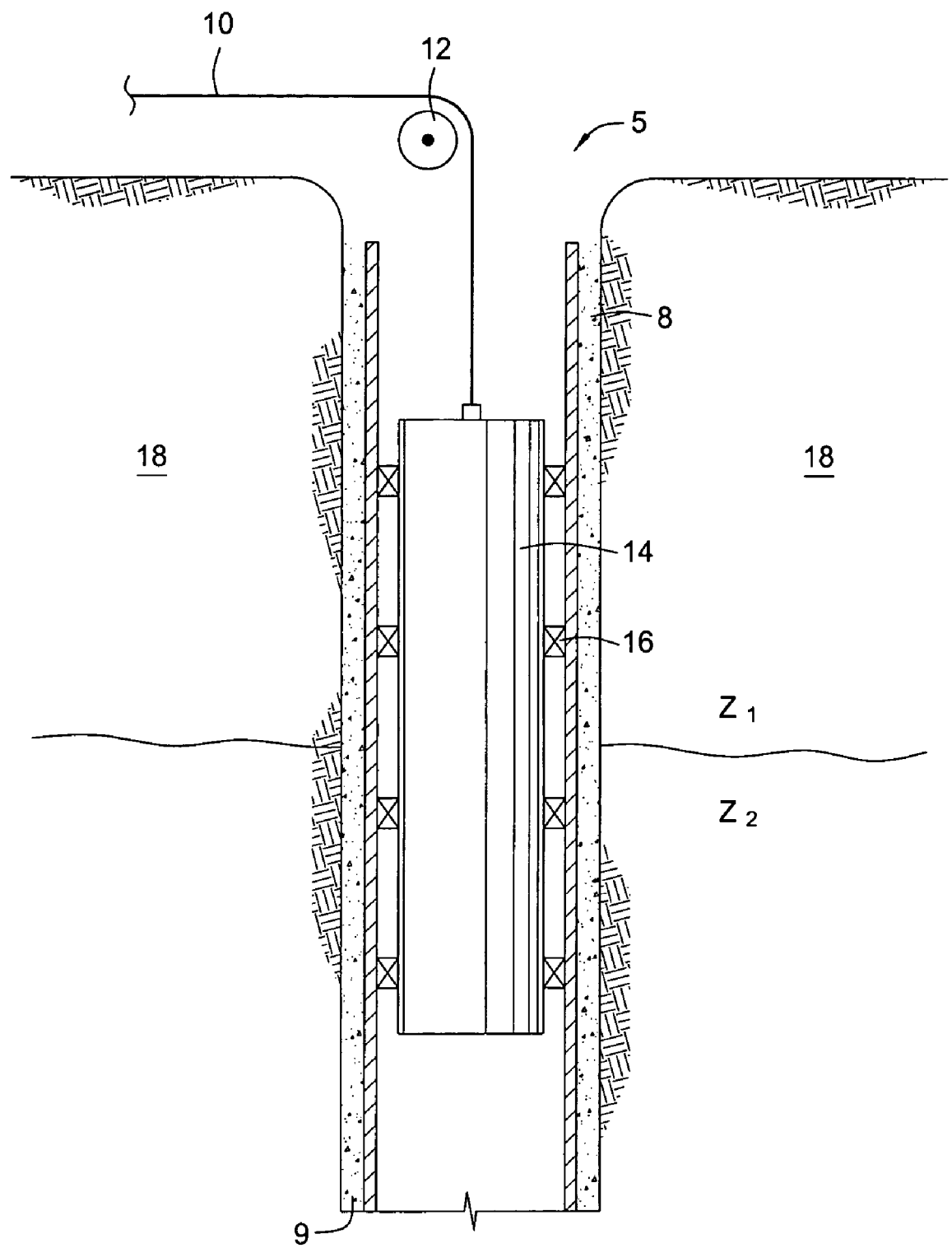
FIG. 1 depicts a partial cross section of prior art downhole cement bond log tool disposed within a wellbore.
Figure 3:
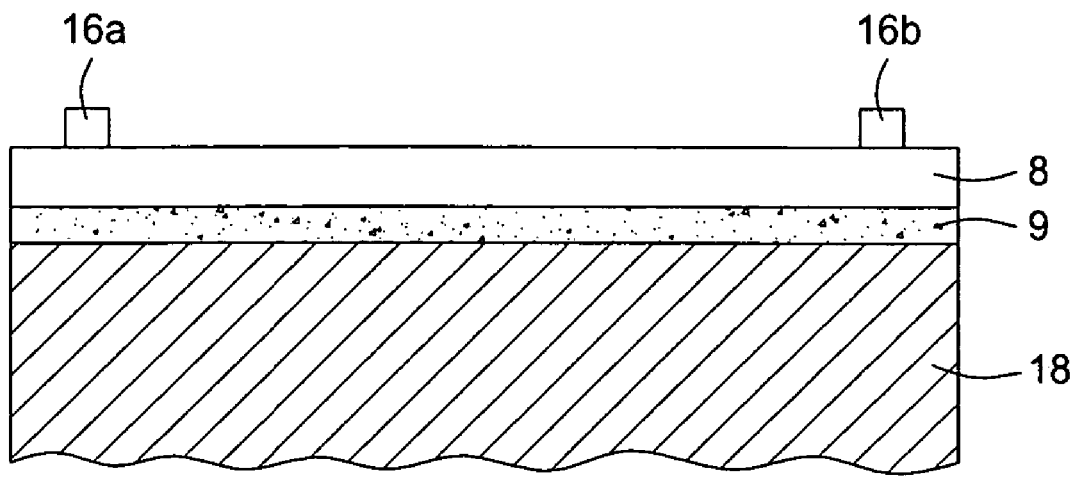
FIG. 3 depicts a cross sectional view of a portion of casing bonded to a formation with a pair of transducers.

With reference now to FIG. 3, wherein is illustrated a partial cross section of a section of casing 8 attached to adjoining formation 18 with cement 9. Disposed on the inner diameter of the casing 8 are first and second transducers (16a, 16b). These transducers (16a, 16b) can both be capable of transmitting a signal, receiving a signal, or both. The signal considered for the present invention includes acoustic waves that are not only Lamb waves, but also Raleigh waves, compressional waves, shear waves, transversely polarized shear waves, as well as combinations of these waveforms.

For example, the first transducer 16a could produce an acoustic signal propagating along the casing 8 towards the second transducer 16b. As noted above, many acoustic waves used in bond logging operations may be adequate when dealing with traditional cements, but do not couple well into light weight cements. Thus these waves will have diminished wave attenuation along the casing 8 when the casing is bounded by a light weight cement. In contrast, it has been discovered that Lamb waves can couple well into light weight cements and thus Lamb waves will experience measurable attenuation when induced in casing 8 surrounded by light weight cement. Therefore Lamb waves are well suited for use in the analysis of cement bonds comprised of regular or light weight cement.

Figure 4:
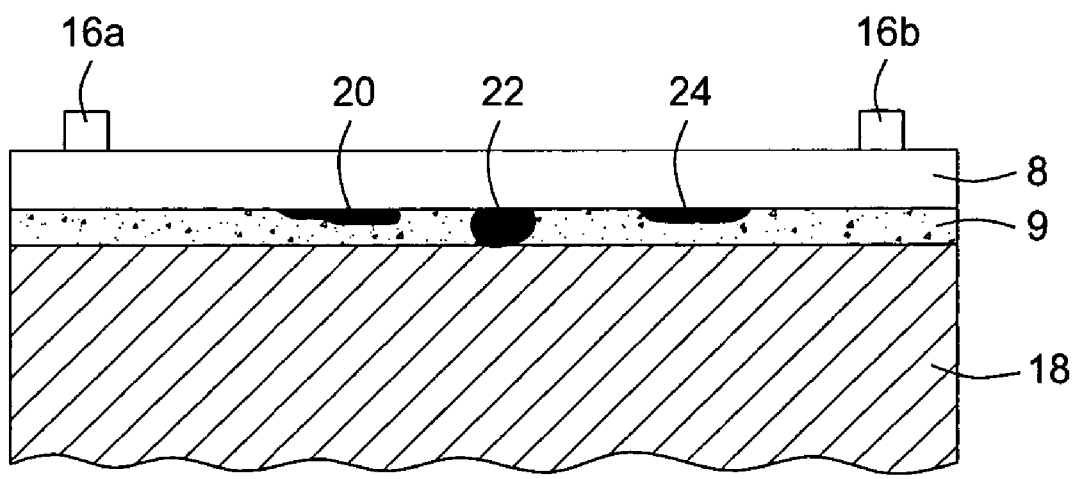
FIG. 4 depicts a cross sectional view of a portion of casing bonded to a formation with a pair of transducers, where the bond contains defects.

Furthermore, propagating Lamb waves into the bond can also help detect defects therein, such as the presence of a microannulus 20 or water 22, as well as a poor bond 24. As noted above, Lamb waves have the capability to couple into light weight cements, but will not couple into bond defects. As such, the presence of any of these defects disposed between a transmitting and a receiving transducer can be discovered by monitoring the resulting attenuation of the Lamb wave propagating across the defect. It is well within the capabilities of those skilled in the art to study monitored attenuation results in order to detect the presence of bond defects. It should be pointed out that the transducer in question can comprise two or more transducers (16a, 16b) as shown in FIGS. 3 and 4, but could also comprise a single transducer capable of transmitting and receiving an acoustic signal.

Analysis of a Lamb wave's attenuation induced within casing 8 can reveal not only cement characteristics, but also the presence of cement surrounding the casing 8. Also measurable in this manner is the quality of a casing bond and the integrity of cement forming a casing bond. Skilled practitioners are further capable of determining a dimension of the area that is formed between the casing 8 and the surrounding formation 18. Values for other cement or casing bond characteristics that can be similarly derived include density, compressive strength, tensile strength, mechanical elastic properties, Young's Modulus, Poisson's ratio, and porosity.

The transducers 16 considered for use with the present invention include without limitation, piezoelectric devices, electromagnetic acoustic transmitters (EMAT), and wedge type transducers. The principles of EMAT operation involve placing a wire near the surface of an electrically conducting object (magnetic or non-magnetic) and flowing current through the wire. This configuration induces eddy currents in the object by electromagnetic induction (based on electromagnetic skin effect). In the presence of a static magnetic field (B) these induced eddy currents (J) experience Lorenz forces (f) given by vector product of those two fields:

$$f = J \times B \qquad (1)$$

Figure 5:
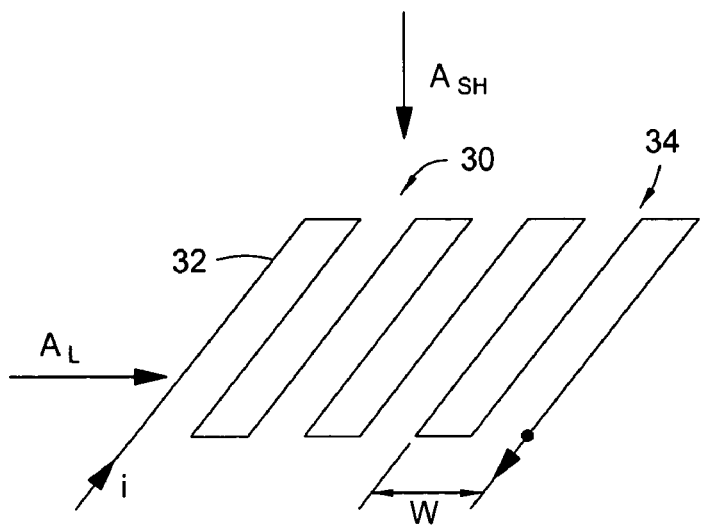
FIG. 5 is a schematic representation of an EMAT device.

Through a variety of interactions, these Lorenz forces are transmitted into the object and serve as a source of acoustic waves. Depending on the mutual orientation of the fields one can use EMAT to generate shear waves or Lamb waves in casing. With reference now to FIG. 5 a schematical view of an EMAT with associated magnetic fields ($A_L$, $A_{SH}$) is shown. In this simplified illustration of an EMAT 30 a wire 32 is shown formed into a series of loops 34. The EMAT 30 is in electrical communication with a current source (not shown) that provides a current i to the wire 32. Applying the static magnetic field $A_L$ when the EMAT 30 is disposed proximate to an object, such as the inner diameter of a section of casing 8, will in turn induce a Lamb wave within the casing 8. Similarly, if the static magnetic $A_{SH}$ field is applied to a section of casing 8, a shear wave can be induced within the casing 8.

As is known in the art, the wavelength of Lamb waves produced by EMAT devices is dependent upon the width W of the coil loops 34 within the EMAT 30. Typically there is a one to one relationship between the width W of the coil loop 34 and the wavelength λ of the Lamb wave produced by the EMAT 30. Thus the Lamb wave wavelength produced by a specific EMAT can be controlled by controlling the width W of the coil loop 34.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. A method of evaluating a characteristic of a bond between a casing and a formation comprising:
   inducing a Lamb wave into the casing using an EMAT;
   receiving the Lamb wave with an EMAT to monitor said Lamb wave attenuation; and
   detecting a bond defect based on said attenuation monitoring of said Lamb wave.

2. The method of claim 1, wherein said Lamb wave is induced with a single transmitting transducer and the attenuated Lamb wave is monitored with a single receiving transducer.

3. The method of claim 1, wherein the bond defect is a microannulus.

4. The method of claim 1 wherein said characteristic is selected from the group consisting of the presence of cement; the presence of microannuluses; a dimension of the area; density; compressive strength; tensile strength; mechanical elastic properties; Young's Modulus; Poisson's ratio; and porosity.

5. The method of claim 4 wherein the composition of the area between the casing and the formation comprises regular cement.

6. The method of claim 1 further comprising detecting the presence of a free pipe zone disposed adjacent the casing.

7. The method of claim 1 wherein the defect is a poor bond.

8. The method of claim 1 wherein the composition of the area between the casing and the formation comprises light weight cement and wherein the Lamb wave couples into the light weight cement, the method further comprising monitoring of the Lamb wave propagating through light weight cement to determine defect information of the light weight cement.

9. The method of claim 1 further comprising measuring the attenuation of separate modes of the Lamb wave.

10. A method of evaluating cement disposed between a casing and a wellbore comprising:
    inserting a downhole tool within the casing having an EMAT;
    inducing a Lamb wave in the casing with the EMAT of said downhole tool;
    receiving the Lamb wave with an EMAT and monitoring the attenuation of said Lamb wave; and
    estimating a characteristic of the cement based on an evaluation of the attenuation of said Lamb wave.

11. The method of claim 9 wherein the characteristic of the cement is selected from the group consisting of the presence of a cement; the presence of microannuluses; a dimension of the cement; density; compressive strength; tensile strength; mechanical elastic properties; Young's Modulus; Poisson's ratio; and porosity.

12. The method of claim 11 wherein the type of cement evaluated comprises regular cement.

13. The method of claim 10 further comprising detecting the presence of free pipe adjacent the casing.

14. The method of claim 10 wherein the characteristic of the cement comprises the integrity of cement.

15. The method of claim 10 wherein the type of cement evaluated comprises light weight cement and wherein the Lamb wave couples into the light weight cement, the method further comprising monitoring of the Lamb wave propagating through light weight cement to determine defect information of the light weight cement.

16. The method of claim 10 further comprising measuring the attenuation of separate modes of the Lamb wave.

* * * * *